United States Patent [19]

True et al.

[11] Patent Number: 4,496,969

[45] Date of Patent: Jan. 29, 1985

[54] LIGHT VALVE PROJECTION SYSTEM WITH IMPROVED VERTICAL RESOLUTION

[75] Inventors: Thomas T. True, Camillus; William E. Good, Liverpool, both of N.Y.

[73] Assignee: General Electric Company, Portsmouth, Va.

[21] Appl. No.: 452,188

[22] Filed: Dec. 22, 1982

[51] Int. Cl.³ .............................................. H04N 9/31
[52] U.S. Cl. ..................................................... 358/62
[58] Field of Search ...................... 358/60, 62; 350/361

[56] References Cited

U.S. PATENT DOCUMENTS

| | | | |
|---|---|---|---|
| 3,437,746 | 4/1969 | Good | 358/62 |
| 3,585,283 | 6/1971 | Graser, Jr. | 358/62 |
| 3,730,992 | 5/1973 | True | 358/62 |
| 3,806,636 | 4/1974 | True | 358/62 |
| 4,283,120 | 8/1981 | Orser | 350/361 |

Primary Examiner—Michael A. Masinick

[57] ABSTRACT

A light valve projection system is disclosed in which information is impressed on a light modulating fluid overlying a disk wherein incident light is modulated by the information and projected onto a viewing surface. The fluid layer includes a raster area within which the information is written by the deposition of electric charge along scanning lines so as to form orthogonally related diffraction gratings which are parallel to a pair of coordinate axes in the plane of the disk. The diffraction gratings are composed of one set of gratings parallel to the scanning lines which contain green color information, and two sets of diffraction gratings orthogonal to the scanning lines containing red and blue color information. Improved green channel vertical resolution is obtained by axis dwell modulation of the scanning lines to better confine the detail modulation to the raster line axis. Modulation is accomplished by causing the scanning electron beam to dwell at the axis thus forming a diffraction grating with much of the charge confined to the raster line axis.

11 Claims, 7 Drawing Figures

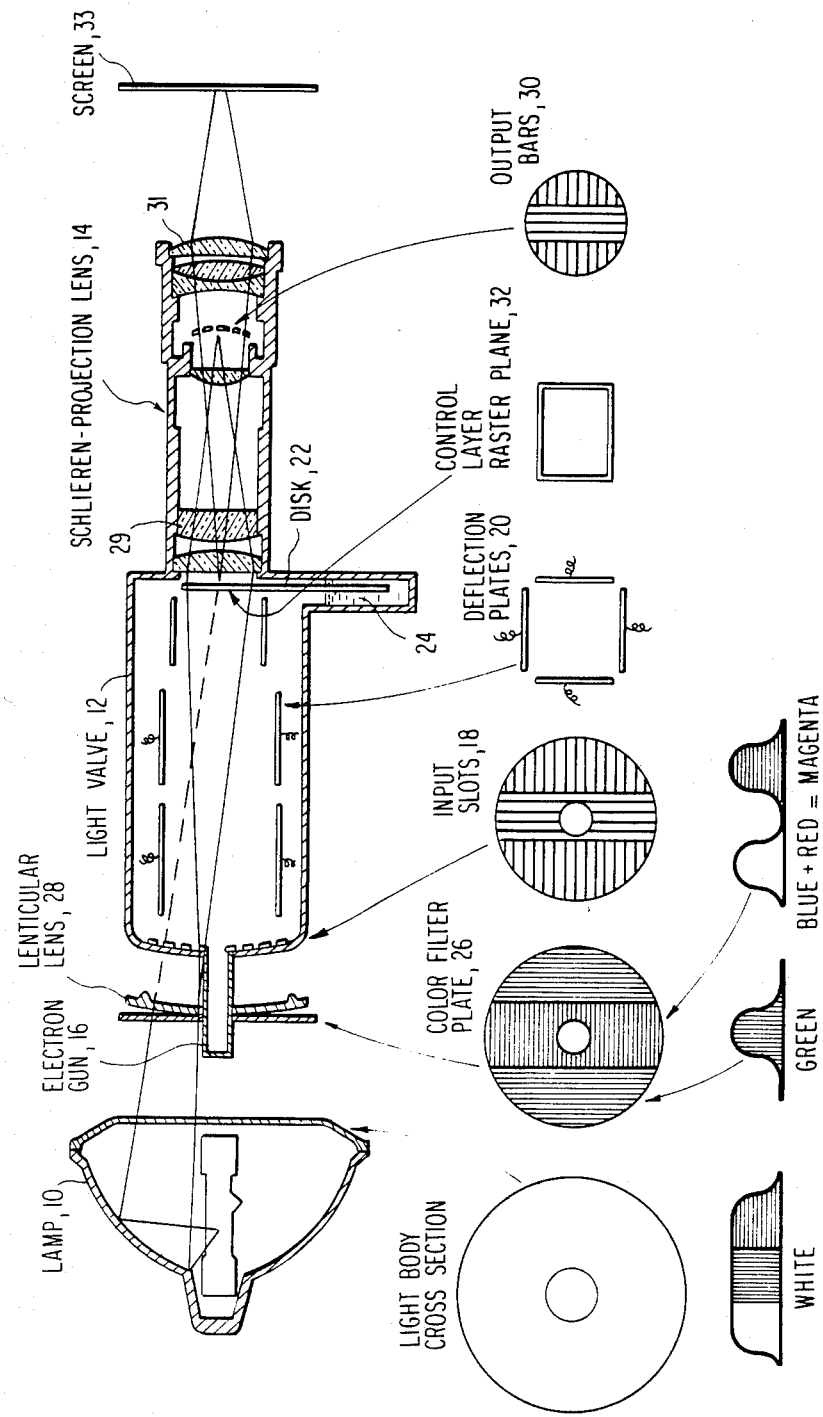

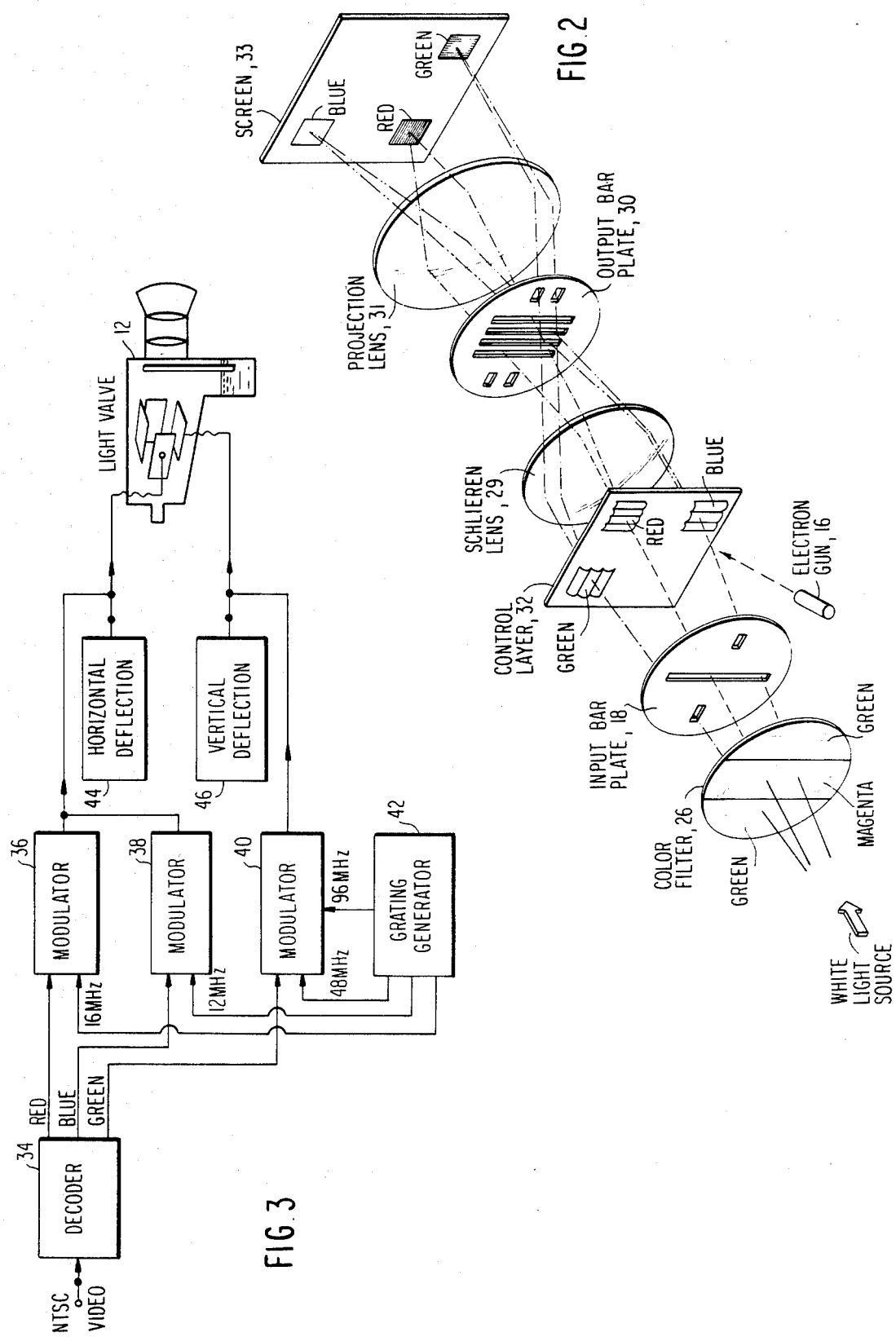

LIGHT VALVE PROJECTION SYSTEM WITH IMPROVED VERTICAL RESOLUTION

BACKGROUND OF THE INVENTION

This application is related to a concurrently filed patent application, Light Valve Projection System With Improved Vertical Resolution, Ser. No. 452,162, filed on behalf of T. True, W. Good and W. Bates.

The invention pertains to the field of light projection systems employing a deformable transparent light modulating medium which diffracts incident light to form projected images in accordance with modulating information. More particularly, the invention relates to such systems in which the light modulating medium is a fluid overlying a disk and information is written by an electron beam which scans out a raster on the fluid and forms orthogonally related diffraction gratings which control light rays transmitting the superimposed information necessary for color projection, systems of this type having been commonly termed light valve projection systems. The diffraction ratings are composed of one set of diffraction ratings parallel to the scanning lines containing, for example, green color information and two sets of diffraction gratings orthogonal to the scanning lines, in this example containing red and blue color information.

Light valve projection systems have been in commercial use for many years and are capable of providing good performance. Nevertheless, a number of problems have existed with respect to these systems of differing degrees of importance. A number of these problems such as those relating to the composition and processing of the fluid medium and overall light efficiency of the projected image have been substantially overcome. Another problem termed "burn-in" which produces a moire pattern of color, predominantly green, appearing within the projected picture has been solved by the invention of David A. Orser et al as described in U.S. Pat. No. 4,283,120. According to the Orser et al invention, a rotatable disk is mounted within the housing and has its lower portion immersed in a sump which holds the light modulating fluid so that the fluid covers over at least one surface of the disk during rotation. The raster is positioned on the disk offset from the coordinate axes so that movement of the fluid responsive to the disk rotation is along paths that intersect the diffraction gratings obliquely over the entire raster. Burn-in is eliminated because fluid motion never becomes tangential to either grating axis.

While the light valve projection system has been improved by the invention of David A. Orser et al, a parameter requiring improvement has been green vertical resolution. In the conventional approach, the green light is modulated by vertical diffractions caused by the grooves which the raster lines themselves write, and in order to produce a green "dark field" condition, the electron beam is wobbled so that adjacent raster lines just touch thereby producing a uniform charge density vertically. As green light is desired, the wobbling is decreased so that the charge distribution is changed causing the fluid film to deform so that some diffraction is produced. The decrease in wobbling is produced by negative amplitude modulation of the envelope of a wobbulating carrier. It is this negative amplitude modulation and consequent response of the control layer that causes lower than desired vertical resolution in the green channel. The low vertical resolution occurs because the light refracting sides of the grooves are displaced from the desired raster line location by as much as ±1 raster line spacing. For a green dark field, the wobble carrier spreads the charge for any one raster line over a vertical space equivalent to two raster line spaces. Subsequent modulation for a green light field decreases the carrier amplitude resulting in the detail information being displaced vertically from the raster line center. The result is the superposition of two images vertically displaced on either side of the desired location.

SUMMARY OF THE INVENTION

Accordingly, the primary object of the present invention is to provide a novel light valve projection system in which superior vertical resolution is achieved when compared to the resolution produced by conventional negative amplitude modulation of the charge controlling electron beam wobbulation.

Briefly, this object of the invention is accomplished in a light valve projection system which employs an axis dwell modulation of the vertical wobbulating scanning lines to better confine the light image of a given raster line to the raster line axis. The modulation causes the electron beam to dwell at the axis thus forming a diffraction grating with much of the charge confined to the raster line axis. In a preferred embodiment of the invention, the axis dwell modulation is produced by a double modulator, one for the wobble carrier frequency and one for the second or higher harmonic of the wobble carrier frequency. In order to produce a light field, the wobble carrier amplitude may be negatively modulated as before, but the second harmonic of the wobble carrier frequency is also positively modulated in order to produce the axis dwell light field modulation condition. The optimum ratio of video gains between the two modulators has been determined to be about 5:1 with the second harmonic modulator having the higher gain. In adddition, it has been determined that the brightness of the projected image is increased when using axis dwell modulation by using a small spot color valve. In comparison with a typical color valve beam which normally has a height of 2.4 mils and a width of 0.35 mils, a small electron spot color valve has an electron beam height of approximately 1.1 to 1.2 mils. While the axis dwell modulation has as its primary purpose the improvement of vertical resolution and the smaller spot size the improvement in brightness, the two are not mutually independent, and the present invention is most advantageously practiced using both.

BRIEF DESCRIPTION OF THE DRAWINGS

While the specification concludes with the claims which particularly point out and distinctly claim that subject matter which is regarded as inventive, it is believed the invention will be more clearly understood when considering the following detailed description taken in connection with the accompanying figures of the drawings, in which:

FIG. 1 is a schematic diagram showing the principal parts of a single gun color television light valve system;

FIG. 2 is a simplified diagram of the light valve system shown in FIG. 1 illustrating the color selection action of the three basic gratings;

FIG. 3 is a block diagram of the light valve circuitry;

DESCRIPTION OF A PREFERRED EMBODIMENT

Figure 4:
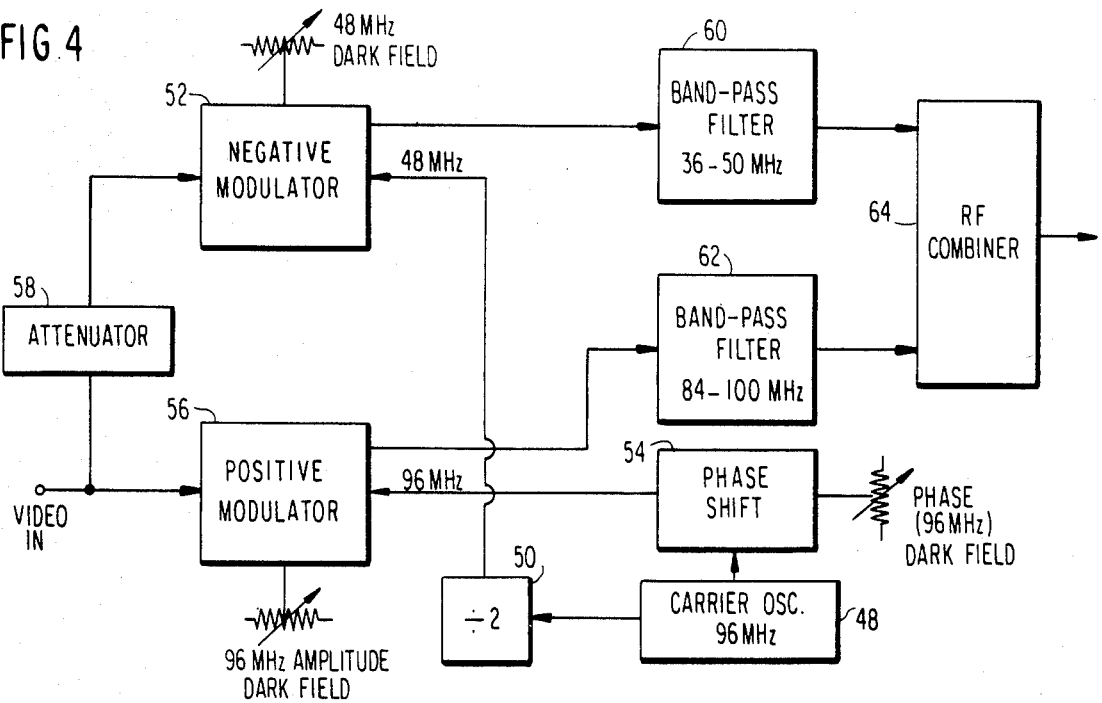
FIG. 4 is a block diagram of the double modulator circuitry used to produce the axis dwell green composite RF signal according to a preferred embodiment of the invention.

Referring to FIG. 1, there is schematically shown a single-gun color television light valve assembly comprising a xenon lamp 10, sealed light valve 12, and schlieren projection lens 14. The sealed light valve 12 contains the electron gun 16, input slots 18, deflection plates 20, the control layer on the rotating disk 22, and the fluid reservoir 24. The light from the lamp 10 is projected through a color filter plate 26 and a lenticular lens 28 before entering the light valve 12. The schlieren projection lens 14 includes a schlieren lens 29, output color selection bars 30 and a projection lens 31. The lower half of FIG. 1 shows the cross sections of the light body and light valve. The spectral diagrams at the bottom indicate how the light is prefiltered before entering the light valve. FIG. 2 is a simplified light valve diagram showing the color selection action of the three basic gratings. In FIG. 2, the control layer 32 which is supported by the rotating disk 22 (shown in FIG. 1) is illustrated as having three diffraction gratings for red, green and blue light. These diffraction gratings may be written individually or simultaneously and normally are actually superimposed but for purposes of illustration only, they are shown in FIG. 2 as separated on the control layer 32.

In the light valve projection system in FIGS. 1 and 2, green light is passed through the horizontal slots of the input bar plate 18 and is controlled by modulating the effective height of the raster lines on the control layer 32. This is done by means of a high frequency carrier applied to the vertical deflection plates and modulated by the green video signal. Magenta (red and blue) light is passed through the vertical slots of the input bar plate 18 and is modulated by diffraction gratings created at right angles to the raster lines by velocity modulating the electron spot in the horizontal direction. This is done by applying, in the subject embodiment, a 16 MHz (12 MHz for blue) signal to the horizontal deflection plates and modulating it with the red video signal. The grooves created in the control layer 32 have the proper spacing to diffract the red portion of the spectrum through the output slots in plate 30 while the blue portion is blocked. For the 12 MHz carrier, the blue light is passed by the slots in plate 30 and the red is blocked. Thus, three simultaneous and superimposed primary color pictures are written with the same electron beam and projected to the screen 33 as a completely registered full color picture. Colors are created by writing miniature diffraction gratings within each picture element on the fluid surface by manipulating the single scanning electron beam. These gratings break up the transmitted light into its spectral colors which appear at the output bars where they are spatially filtered to let the desired color reach the screen. This technique permits a full color television picture to be written on a single control layer with no need for further registration.

FIG. 3 is a block diagram of one embodiment of the light valve projector circuitry as it pertains to the subject invention. A composite video signal is supplied to the input of a decoder 34 which provides at its output red, blue and green signals. These signals are respectively applied to modulators 36, 38 and 40. A grating generator 42 supplies carrier signals having frequencies of 16 MHz and 12 MHz, respectively, to modulators 36 and 38 and signals having frequencies of 48 and 96 MHz to modulator 40. The outputs of the red and blue modulators 36 and 38 are combined and superimposed on the horizontal deflection signal from the horizontal deflection signal generator 44. The output of the green modulator 40 is superimposed on the vertical deflection signal from the vertical deflection generator 46.

According to a preferred embodiment of the present invention, the green modulator 40 comprises a double modulator as shown in more detail in FIG. 4. The carrier frequency of 48 MHz supplied by the carrier generator 42 is produced by a 96 MHz carrier oscillator 48 and a divide by two frequency divider 50. The resultant 48 MHz carrier signal is suplied to the negative modulator 52 which is essentially the same as the negative modulator used in the prior light valve projection systems. The 96 MHz carrier signal is supplied by adjustable phase shifter 54 to the positive modulator 56. In practice, the phase shifter is used to shift the phase of the 96 MHz signal so that its 0° phase time occurs at the vertical deflection plates at about the same time as the 0° and 180° phase times of the 48 MHz signal. The input video signal is supplied directly to the positive modulator 56 and via attenuator 58 to the negative modulator 52. The attenuator 58 adjusts the relative modulating signal amplitudes to modulators 52 and 56 to between 1:2 and 1:7, e.g., the modulating amplitude of the positive modulator 56 is greater than that of the negative modulator 52. Within this range, an attenuation ratio of 1:5 provides excellent performance. In practice, a separate attenuator 58 need not be used as the same result can be obtained by suitably adjusting the gain of the modulator 52. The output of negative modulator 52 is filtered by bandpass filter 60 having a pass band of 36 to 50 MHz, and the output of positive modulator 56 is filtered by bandpass filter 62 having a passband of 84 to 100 MHz. The outputs of these two filters are combined in RF combiner 64 to produce the axis dwell green composite RF signal which is superimposed on the vertical deflection signal.

Figure 5A:
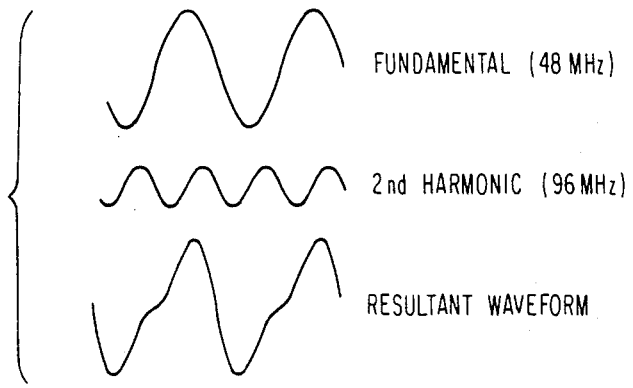
FIGS. 5A and 5B are waveform diagrams showing respectively dark field and light field modulation conditions.
Figure 5B:
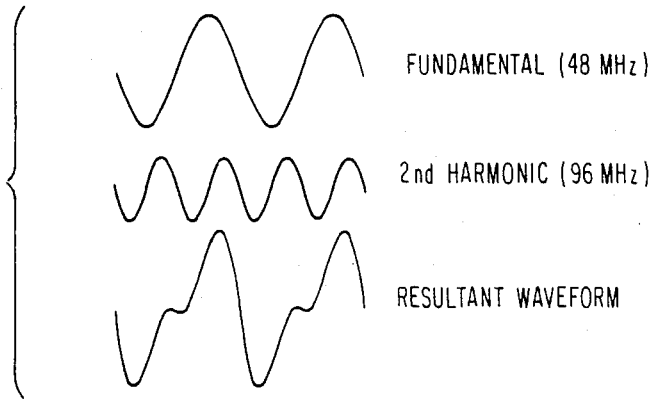

FIGS. 5A and 5B show the signal waveforms for the dark field and light field modulation conditions, respectively. In both of these figures, the top waveform is the fundamental 48 MHz carrier signal which, although not shown by FIG. 5B, is negatively modulated by modulator 52. The second waveform is the 96 MHz second harmonic which is positively modulated by modulator 56 as illustrated in FIG. 5B. The resultant waveform is shown at the bottom of each of the figures. In FIG. 5B, the second harmonic component has been positively modulated to approximately twice the dark field value. Note that the spot not only dwells at the axis but is displaced at the peaks of the resultant waveform since the peak to peak value is greater than that of dark field waveform in FIG. 5A. It is to reduce this peak excursion that the 48 MHz fundamental is negatively modulated by modulator 52. While the invention can be practiced using a single modulator providing positive modulation of the 96 MHz second harmonic signal with no negative modulation of the 48 MHz fundamental signal as illustrated in FIGS. 5A and 5B, it has been demonstrated that the sharpness in the vertical direction for a single horizontal line is better for the two modulator approach shown in FIG. 4. This corresponds to a decrease in the spread function for an impulse in the vertical direction. This improved transient response of the two modulator approach produces a superior graphics display.

Figure 6:
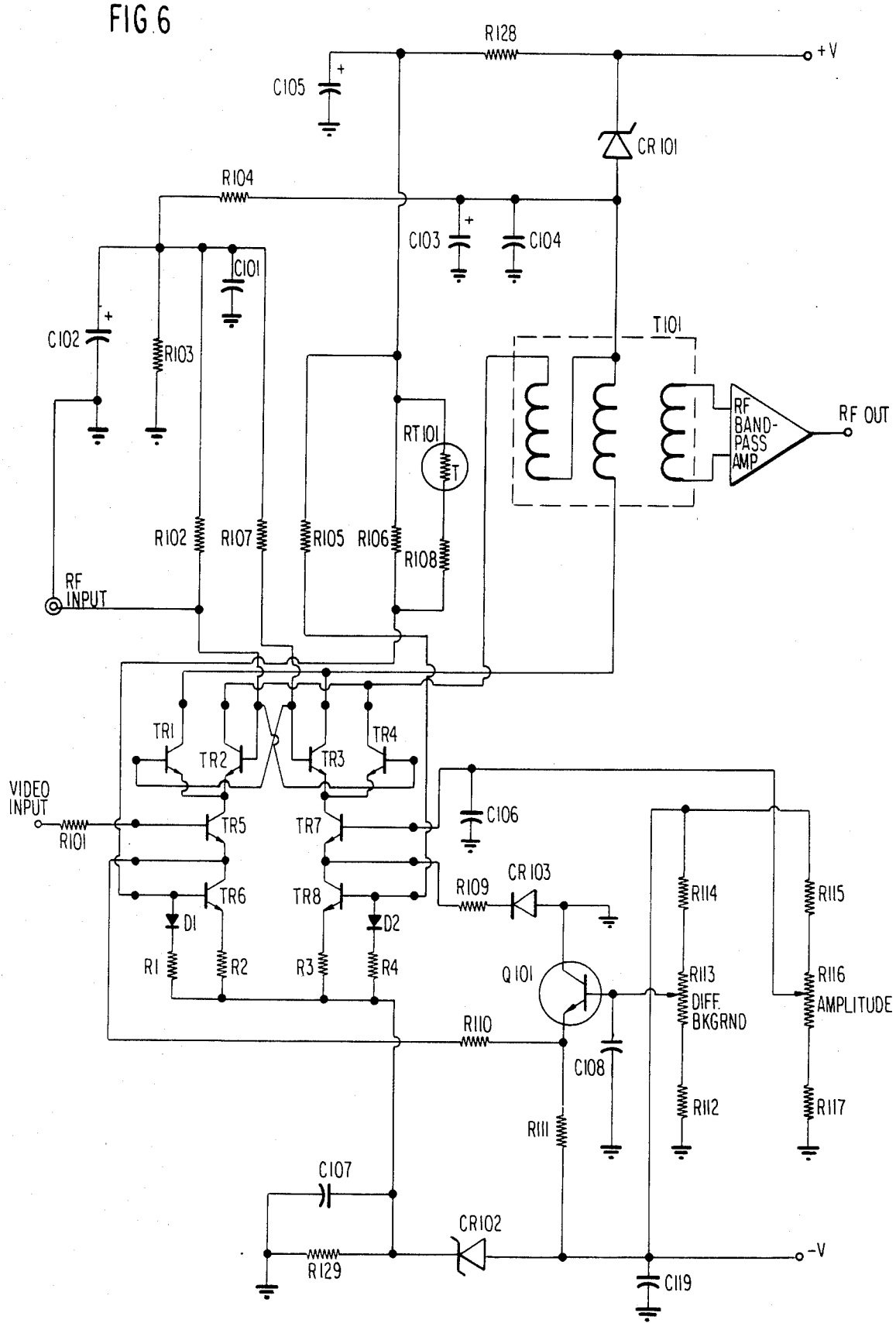
FIG. 6 is a simplified schematic diagram of the positive modulator used in the circuitry of FIG. 4.

A simplified schematic diagram of the circuit of the positive modulator 56 is shown in FIG. 6. This modulator is composed of two identical differential amplifiers comprising transistors TR1, TR2 and TR3, TR4. The 96 MHz second harmonic signal RF input is supplied from emitter coupled logic to the bases of transistors TR2 and TR4, while a reference voltage established by Zener diode CR101 and the voltage divider comprising resistors R104 and R103 is supplied to the bases of transistors TR1 and TR3. The transistor pair TR1, TR2 is driven by a current source comprising series connected transistors TR5 and TR6 with the video signal being connected to the base of transistor TR5. Similarly, the transistor pair TR3, TR4 is driven by a current source comprising series connected transistors TR7 and TR8; however, the base of transistor TR7 is connected to the wiper of a potentiometer R116 which is an amplitude adjustment for dark field control. Reference voltages are supplied to the bases of transistors TR6 and TR8 from resistors R106 and R105, respectively, and these reference voltages control the magnitude of the current sources. Thus, the current sources driving the upper transistor pairs provide the video and dark field inputs so that the dark field component is provided by one of the differential amplifier pairs and the video modulation by the other. Transistors TR5 and TR7 control the current flows of their respective current sources, and current returns are provided at the common connections between the emitter of transistor TR5 and the collector of transistor TR6 and between the emitter of transistor TR7 and the collector of transistor TR8. The current return to the collector of transistor TR8 is via resistor R109 and diode 103 and is fixed. However, the current return to the collector of transistor TR6 is via resistor R110 and the emitter of transistor Q101 and is adjustable by means of potentiometer R113 which supplies an adjustable bias voltage to the base of transistor Q101. Resistor R110 controls the overall gain of the light field and, in effect, replaces the attenuator 58 shown in FIG. 4. Potentiometer R113 permits adjustment of the differential background. The collectors of the transistors TR1 and TR3 are connected in common to a first winding of transformer T101, and the collectors of transistors TR2 and TR4 are connected in common to a second winding of transformer T101. The other ends of the first and second windings are in turn connected in common to a source of positive voltage through the zener diode CR101. The first and second windings of transformer T101 are connected such that the outputs of the two differential amplifiers are summed in phase in the third winding of transformer T101 which is connected to an RF bandpass amplifier.

The transistors TR1 to TR8 and their associated resistors R1 to R4 and diodes D1 and D2 are part of an integrated circuit manufactured by Phillips with the circuit designation of TCA 240.

In operation, the dark field amplitude adjustment is made using potentiometer R116 with transistor TR5 cut off. The differential background adjustment is made using potentiometer R113 to balance effects of the 48 MHz and 96 MHz signals. The differential amplifier pair TR1, TR2 provide the light field modulation, and the differential amplifier pair TR3, TR4 provide the dark field amplitude control of the 96 MHz RF input signal.

The invention has been described in a preferred embodiment as being practiced with the double modulation of the fundamental carrier signal and the second harmonic signal. As has already been mentioned, the invention can also be practiced with a single modulator providing positive modulation to the second harmonic signal only. It is also possible to use the third harmonic signal instead of the second harmonic signal in either a single or double modulator approach. The third harmonic offers the potential of higher efficiency since the axis dwell time occurs twice per cycle of the fundamental. Furthermore, while the invention has been described in a preferred embodiment as an improvement to a color light valve projection system, the invention is equally applicable to a monochrome light valve projection system. In such a system, only the raster scan lines are generated to form the horizontal diffraction gratings and the related orthogonal diffraction gratings are not produced. Obviously, the related orthogonal input slots and output bars are not required. In such a monochrome light valve projection system, the subject invention improves the verticle resolution of the projected image.

Although the invention has been described with respect to a specific embodiment for complete and clear disclosure, the appended claims are not to be thus limited but are to be construed as embodying all modifications and alternative constructions that may occur to one skilled in the art which fairly fall within the basic teaching herein set forth.

We claim:

1. A light valve projection apparatus including electron beam means for scanning a raster of orthogonally related diffraction gratings on a light modulating fluid to diffract incident light into different spectral colors for projection onto a viewing surface, said electron beam means including vertical and horizontal deflection means and modulating means connected to said vertical and horizontal deflection means for controlling the depth of the grooves in said diffraction gratings thereby controlling the diffraction of said incident light into different spatial directions and angular deviations permitting control of the color components, said modulating means comprising:

carrier signal generating means for generating a plurality of carrier signals each having a different frequency, the frequency of each carrier signal being higher than any video signal to be reproduced, to diffract light of a predetermined spectral color, first modulator means connected to receive at least one of said carrier signals and at least one video signal corresponding to at least one predetermined spectral color for modulating the carrier signal with the video signal and applying the modulated signal to said horizontal deflection means, second modulator means for receiving a second one of said carrier signals and a second video signal corresponding to a second predetermined spectral color for modulating the carrier signal with the video signal and applying the modulated signal to said vertical deflection means, said second one of said carrier signals including a fundamental signal and a phase controlled harmonic signal and said second modulator means positively modulating said harmonic signal and combining the modulated harmonic signal with said fundamental signal so that the resultant modulated signal applied to said vertical deflection means produces an axis dwell modulation of the charge deposited to form the horizonal grooves of one of said diffraction gratings.

2. Light valve projection apparatus as recited in claim 1 wherein said harmonic signal is the second harmonic of said fundamental signal.

3. Light valve projecting apparatus as recited in claim 1 wherein said harmonic signal is the third harmonic of said fundamental signal.

4. Light valve projecting apparatus as recited in claim 1 wherein said second modulator means further negatively modulates said fundamental signal before combining the fundamental signal with the positively modulated harmonic signal.

5. Light valve projection apparatus including electron beam means forming a raster scanned diffraction grating on a light modulating fluid to diffract incident light for projection onto a viewing surface, said electron beam means including vertical and horizontal deflection means for controlling the depth of the grooves in said diffraction grating thereby controlling the diffraction of said incident light, said modulating means comprising:

carrier signal generating means for generating a carrier signal and a harmonic of said carrier signal, the frequency of said carrier signal being higher than any video signal to be reproduced, modulator means for receiving said carrier signal and said harmonic of said carrier signal and for receiving a video signal carrying image information, said modulator means positively modulating said harmonic of said carrier signal with said video signal and combining the modulated harmonic signal with said carrier signal so that the resultant modulated signal applied to said vertical deflection means produces an axis dwell modulation of the charge deposited to form the horizontal grooves of said diffraction grating.

6. Light valve projection apparatus as recited in claim 5 wherein said harmonic signal is the second harmonic of said carrier signal.

7. Light valve projecting apparatus as recited in claim 5 wherein said harmonic signal is the third harmonic of said carrier signal.

8. Light valve projecting apparatus as recited in claim 5 wherein said modulator means further negatively modulates with said video signal before combining said carrier signal with the positively modulated harmonic signal.

9. A method of improving the vertical resolution in a light valve projection apparatus of the type including electron beam means for scanning a diffraction grating on a light modulating fluid to diffract incident light for projection onto a viewing surface, said electron beam means including vertical and horizontal deflection means and modulating means connected to said vertical deflection means for controlling the depth of the grooves in said diffraction grating thereby controlling the diffraction of said incident light, said method comprising:

generating a carrier signal and a harmonic of said carrier signal, the frequency of said carrier signal being higher than any video signal to be reproduced, positively modulating said harmonic of said carrier signal with a video signal carrying image information and combining the modulated harmonic signal with said carrier signal to produce a resultant modulated signal, and applying said resultant modulated signal to said vertical deflection means to produce an axis dwell modulation of the charge deposited to form the horizontal grooves of said diffraction grating.

10. The method according to claim 9 further comprising the step of negatively modulating said carrier signal with said video signal before combining said carrier signal with the positively modulated harmonic signal.

11. The method according to claim 9 further comprising the step of phase controlling said harmonic of said carrier signal with respect to the phase of said carrier signal.

* * * * *